March 14, 1961

K. N. BURNS 2,975,399

SYSTEM FOR PROCESSING SEISMIC DATA

Filed April 8, 1958

Kay N. Burns   Inventor

By *James A. Reilly*   Attorney

March 14, 1961 K. N. BURNS 2,975,399
SYSTEM FOR PROCESSING SEISMIC DATA
Filed April 8, 1958 2 Sheets-Sheet 2

Kay N. Burns Inventor

By James A. Reilly Attorney

United States Patent Office 2,975,399
Patented Mar. 14, 1961

2,975,399

SYSTEM FOR PROCESSING SEISMIC DATA

Kay Neil Burns, Tulsa, Okla., assignor to Jersey Production Research Company, a corporation of Delaware Filed Apr. 8, 1958, Ser. No. 727,080

4 Claims. (Cl. 340—15)

This invention very broadly relates to a system for extracting digital information from analog information. It broadly relates to a method and apparatus for use in seismic prospecting. More particularly, it relates to an improved method and apparatus for obtaining the information from reproducible seismograms—especially for the purpose of correlating, interpreting, or otherwise processing data on the seismograms to obtain information of interest therefrom. The apparatus is especially suited and intended for use in conjunction with a system of processing data obtained from reproducible seismograms on a high speed digital computer.

Geophysical prospecting procedures using artifically induced seismic disturbances have found wide application in the search for petroleum and other general products in all of these methods. It is general practice to initiate an explosive or other seismic disturbance at a point near the surface of the earth and to direct seismic waves downward into the earth from that point. The waves continue to travel downward within the earth, until they encounter discontinuities in the earth's structure in the form of various substrata formations and the like. These discontinuities have the effect of reflecting at least a portion of the seismic waves back toward the surface of the earth. By arranging a plurality of geophones or other seismic transducers at spaced distances from the seismic disturbance points, it is possible to detect the arrival of the reflected seismic waves at the surface of the earth. Furthermore by using accurate timing devices and recording means, it is possible to determine not only the magnitude of the signals received from the various geophones, but also to measure the times required for the seismic waves to travel from the disturbance points down to the various discontinuities and thence to the geophone. It is well known to those in the art that it is possible to calculate and determine the depths of the various discontinuities beneath the surface of the earth.

Relatively recently, a form of seismic prospecting referred to as "velocity profiling" has been initiated and developed in order to improve upon the quality of information obtained from seismic observations. This technique, in general, employs geophone arrays in which the individual geophone stations are spread from one another substantially greater distances than are used in more conventional profiling operations. Furthermore, the elevations and spacing of the geophone locations are determined with greater accuracy. The information which results from the use of this technique is capable of rigid mathematical analysis and makes it possible to determine quite accurately the velocity of seismic waves throughout the portion of the earth under investigation. It will be recognized, of course, that while this technique provides greatly improved seismic information, the technique makes even greater demands upon the interpreter in the form of increased mathematical work. Indeed the mathematical operations become so detailed, precise and lengthy, that the procedure is substantially impractical for manual types of operation.

It is one object of the present invention to provide an improved and simplified system for accelerating and facilitating the processing of information from seismograms. Other objects will be explicitly described or will be readily apparent from the following description.

In a preferred embodiment, this invention relates to a system for extracting the desired information from a multi-trace reproducible seismogram. A reproducible seismogram is mounted on a movable means such as a drum which is oriented with a visual presentation of the seismogram which is mounted on another movable means or drum. Means are provided for driving the reproducible seismogram and visual seismogram in unison. An electrical conducting line is drawn just before, or at, a selected reflection event across the visual seismogram and connects with an index conducting line which is drawn along the seismogram substantially parallel to a zero base line of the traces of the seismogram. The reproducible seismogram and the visual seismogram are oriented with respect to each other as will hereinafter be discussed more fully. Sensing fingers contacting the visual seismogram as it is driven by the fingers control the beginning of a "gating interval" during which period information is selected and extracted from the reproducible seismogram. The information then extracted from the reproducible seismogram is fed through parallel paths. The first path is a time delay circuit and the second parallel path is a no time delay path and allows the system to decide whether to use the signal in the time delay circuit path to actuate a storage or other device capable of receiving the signals for further use. If no signal from the seismogram is received during this gating interval, an artificial signal from a third electrical circuit path is used to actuate such storage device.

Before entering into a detailed description of this invention, it is well to note that several terms are assumed to have the following meanings for the purposes of this description. The term seismic trace or channel is intended to mean the record formed on a recording medium by reception of a train of signals from individual geophone locations. The individual geophone location may of course be composed of several geophones. Each trace is, in effect, a record with time of the occurrence and magnitude of the signals received. The term seismogram is intended to mean a multiple trace recording of a plurality of geophone signals from a seismic observation. The term recording medium or record medium in this description is intended to mean either a non-reproducible or a reproducible type recording medium such as paper, photographic film, magnetic tape, etc., respectively, adapted to receive seismic information. The term valley means the point, as indicated on a visual trace at which the deflection amplitude is a minimum—i.e., the point at which the slope of the trace changes from negative to positive. The term "reflection event" refers to an indication on the seismogram of a reflection from a subterranean strata or other discontinuity in the earth's structure.

The invention may be better understood by reference to the attached drawing in which.

Figure 1:
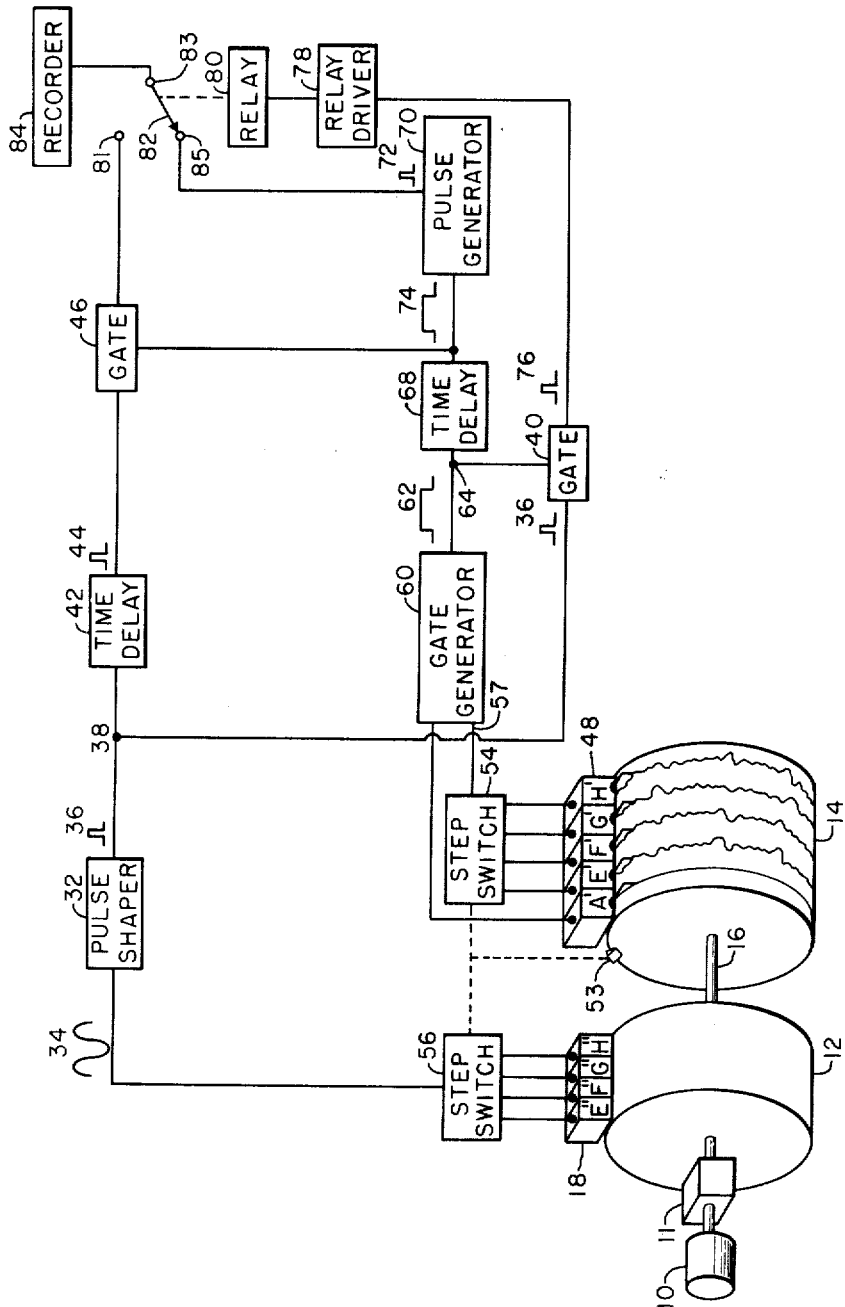
Fig. 1 illustrates a preferred embodiment of the invention as well as the best mode contemplated for carrying out the invention.

Referring specifically to Fig. 1, in which the best mode contemplated for carrying out the invention is illustrated, it will be seen that the apparatus illustrated therein includes motor 10, an analog to digital converter 11, drum 12, and a gate trace drum 14. All of these members are mounted on a common shaft 16 and are preferably driven at a uniform and substantially constant speed by motor 10. Drum 12 is of a character adapted to hold a reproducible type multi-trace seismogram. It is provided with a multiple head bank of transducers 18. For the purposes of this description it will be assumed that the seismogram on the drum is one recorded on magnetic tape. It will further be assumed for the purpose of illustration that the seismogram was obtained in a seismic observation wherein a spread of four geophone locations was employed.

Insofar as mounting the magnetic tape on drum 12 is concerned it should be noted that any suitable means may be used. It is important, however, that the mounting means be such as to position all tapes on the drum in substantially the same manner in order that the information received from different tapes is consistent and correlatable.

Drum 14 is adapted to hold a recording or seismogram which is adapted to provide a visual presentation or record of the information contained on the magnetic tape of drum 12. This visual presentation of the seismogram under consideration may be inked or oscillographic traces, or it may be on electrosensitive paper of a type adapted to form visual traces in response to contact with an electro-stylus for example. In any event, it is desirable that the record on drum 14 be composed of visual traces that correspond in juxtaposition, time dimensions, etc., with the traces of the record on drum 12 which is a reproducible type multi-trace seismogram. In other words, there are two seismograms—a reproducible seismogram on drum 12 and a visual seismogram on drum 14. Equipment capable of providing these arrangements and functions is well known and well understood by those skilled in the art.

Figures 2, 4:
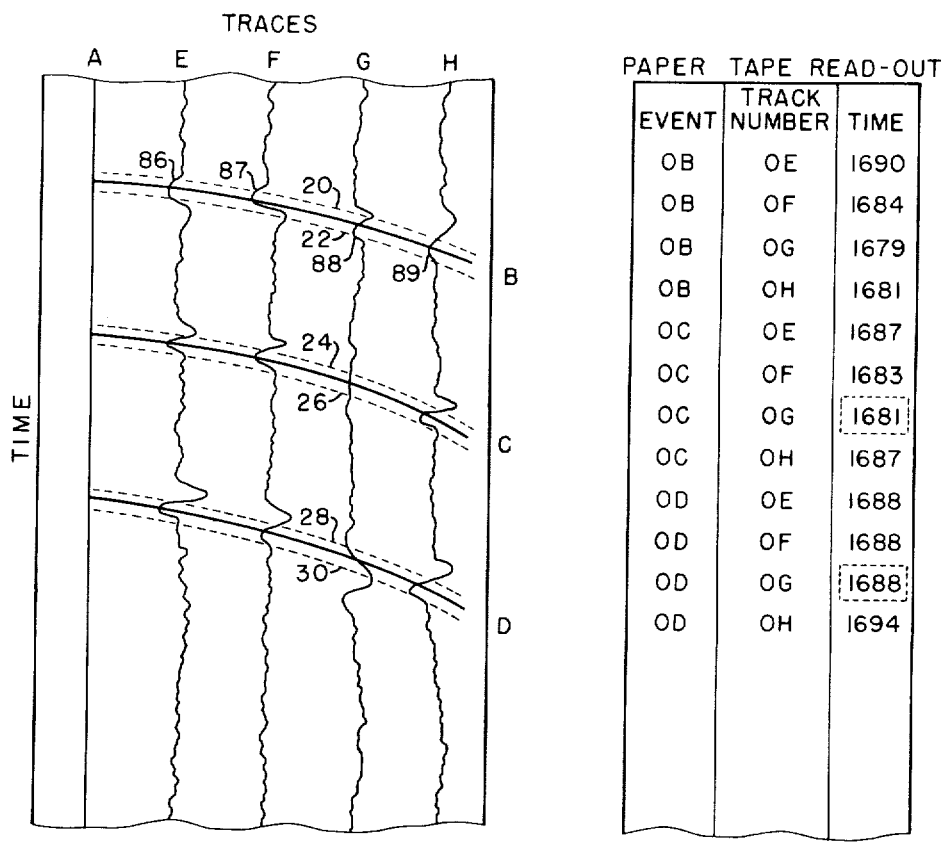
Fig. 2 illustrates schematically and in simplified form a type of visual seismogram such as may be mounted on the apparatus of Fig. 1.

Before proceeding to the remaining components illustrated in Fig. 1, it will be noted that the seismogram recorded on the paper of drum 14 is assumed to be generally like that illustrated in Fig. 2. Referring to Fig. 2 for the moment, there are illustrated a common conductor line A; gate-pulse conductor lines B, C, and D; and traces, E, F, G, and H. Assuming that the geophones forming traces E, F, G, and H were spaced in that order from the shot point, it will be observed that there exist three reflection crossings indicated by gate pulse conductor lines B, C, and D. Common conductor line A and gate pulse conductors lines B, C, and D are made by conducting silver ink or a pencil adapted to make a conducting mark or the like. It will be noted that dotted line 20 is slightly above and 22 slightly below gate pulse conductor line B; dotted line 24 is above and dotted line 26 below line C; and dotted line 28 is above and dotted line 30 below gate pulse conductor line D. The interval between dotted lines 20 and 22 represents one gating time interval; the interval between dotted lines 24 and 26 a second gating time interval; and the interval between dotted lines 28 and 30 a third gating time interval. The nature, purpose and origin of these marks and lines will become more apparent later in this description. They are mentioned here for the purpose of simplifying the description that follows.

Referring back to Fig. 1, the electric signal reproduced by one channel or unit of head bank 18 of one trace of the magnetic tape on drum 12 is transmitted to pulse shaper 32. The electric signal reproduced by head bank 18 is a reproduction of the seismic signal originally generated at a corresponding geophone location and is substantially sinusoidal in form as indicated at 34. Head bank 18 has four units—E", F", G" and H"—which are for reproducing traces E, F, G, and H, respectively. Pulse shaper 32 is adapted to give uniform pulses of a predetermined magnitude and duration at every minimum or valley on seismic signal 34. If desired, pulse shaper 32 may be adapted to give such pulses at either the maximum value or at the zero crossing of seismic signal 34 rather than the minimum. The pulses thus generated are of a uniform height and width as illustrated at 36.

The output signal from pulse shaper 32 is divided at junction 38 into two branches with one branch being fed to gate 40 which is an electronic gate and may be a one-stage amplifier with the grid biased for cut off below a predetermined negative voltage and such that when signals of sufficient magnitude are received, the bias is changed to render the amplifier conductive. The other branch is fed to time delay circuit 42 which may be an inductance capacitor circuit with a predetermined time delay. The output signal from time delay circuit 42 is illustrated at 44 and is of course substantially identical to signal 36. Output signal 44 from time delay unit 42 is fed to electronic gate 46 which may preferably be similar to gate 40.

Sensing unit 48 has a series of fingers or styli A' and E' to H', inclusive, which, as shown, are adapted to ride upon the visual presentation on drum 14. Finger A' is adapted to ride upon common conductor line A as illustrated in Figure 2 and finger E' is adapted to substantially follow trace E, finger F' to follow trace F, G' to follow trace G, and finger H' to follow trace H. Trace selector 54, which may be a multi-contact stepping switch, is used to connect a stylus, such as stylus E', with gate generator 60. After drum 14 has made the desired number of revolutions, step switch or trace selector 54 is actuated by a sequence contact switch 53 which may include a cam arrangement upon drum 14. Trace selector 54, upon being actuated, is adapted to connect the next succeeding stylus F' with lead 57 which in effect connects stylus F' with gate generator 60 and disconnects stylus E'. Sequence switch 53 may also be adapted to actuate step switch 56 to select the next succeeding unit F" of head bank 18 over trace F on the magnetic tape so that the signal reproduced from trace F will be passed to pulse shaper 32 to correspond with the connection of the stylus for visual trace F being connected to gate generator 60. The switching arrangement should be such that the trace being reproduced from the reproducible record on drum 12 corresponds to the trace on the seismogram on drum 14 whose stylus is connected through switch 54 to gate generator 60.

Gate generator 60 which preferably may be a triggered one shot multivibrator is electrically connected to feelers unit 48 and is adapted to have an output signal comprising a gate pulse 62 which is emitted when finger E' contacts a gate pulse conductor on the visual trace on drum 14 such as line B. The gate pulse 62 has a predetermined time duration which sets the length of the gating interval, that is, the interval during which a pulse 36 may initiate the actuation of a unit for translation of analog information. The output signal from gate generator 60 is fed through junction 64 to time delay circuit 68 and gate 40—that is, to the grid of the amplifier in gate 40. Time delay circuit 68 may be similar to time delay circuit 42 and should have the same time delay action. The signals 74 out of time delay circuit 68 are identical to the signal 62 from gate generator 60. The output pulse 74 of time delay circuit 68 is fed to pulse generator 70 which is capable of producing a square wave pulse similar to pulse 44 and during the time interval represented by the duration of the square pulse 74. It should be noted that the square wave 62 may have a fixed time duration preferably within a range of 15 to 50 milliseconds and for most operations it is preferred that this pulse be about 30 milliseconds although this value may vary depending upon the type record being analyzed and other factors such as the frequency content of the seismic signal. The output pulse 72 from pulse generator 70 may be during any time of the duration of pulse 74 which is a delayed pulse 62. However it is normally preferred that pulse 72 be in the middle or center of the duration of pulse 74. The width of pulse 62 is indicated on Fig. 2 as being that length of time between dotted lines 20 and 22, dotted lines 24 and 26, and dotted lines 28 and 30. The width of pulse 62 sets or determines a gating time interval during which period a second signal representative of a valley may be received to open electronic gate 40 or gate 46 during the duration of pulse 74. Various design features including the speed and size of drums 12 and 14 will be taken into consideration to obtain this. It will be noted here that the dotted lines are shown on the visual seismogram to indicate the gating time interval and that portion of each trace reproduced from the magnetic tape during such gating time interval. It is well to note that when stylus E' of feelers 48 is at line B on the visual seismogram, the unit E'' of head bank 18 is so oriented that it is reproducing that part of trace E indicated at dotted line 20. This is also true for the other styli and the corresponding reproducing unit of head bank 18.

Electronic gate 40 is such that it will be opened only upon the pulse 36 reaching the gate during the interval of pulse 62 which is also fed to gate 40. In other words, it takes the combined voltages of pulses 36 and 62 to open electronic gate 40. If gate 40 is opened, a pulse 76 from gate 40 is fed to a relay driver 78 which actuates relay 80 which drives selector switch 83 to make contact with the circuit from gate 46. Arm 82 of switch 83 is driven by suitable mechanical linkage from relay 80 so as to contact contact 81; the mechanical linkage and relay are also so adapted as to return arm 82 to its at rest position which is in contact with contact 85. The output from gate 46 is then fed through switch 83 to translator 84. Unit 84 may be any storage or write out such as punch cards, punch paper tape, flexowriter typewriter, printed paper tape, etc. The gate 40 shuts off after the first pulse 76 passes through the gate and does not open again until during that particular gate interval as represented by pulse 62; or in other words, only one pulse 76 is passed through gate 40 during any gating interval as represented by the duration of pulse 62. Likewise, gate 46 shuts after the first pulse 44 passes therethrough and does not open again during that particular gate interval as represented by pulse 62.

If no pulse 36 reaches gate 40 during a gate interval, then switch 83 stays in its normal contacting position with the output of pulse generator 70 and its is signal 72 which is then passed on to be read in unit 84. It is thus seen that if there is a pulse 36 which is formed by pulse shaper 32 during the gate interval as represented by the pulse 62, then pulse 36 is fed through time delay circuit 42 and gate 46 and switch 83 to recording or storage unit 84; however, if on the other hand no pulse 36 is formed by pulse shaper 32 during the gate interval, an "artificial" or interpolated pulse 72 which is generated by pulse generator 70 during the delayed gate interval as represented by signal 74 is used to feed translator or storage unit 84. The desirability for having this induced or artificial pulse 72 fed to unit 84 when no pulse is actually detected by pulse shaper 32 during the gating interval will become more apparent in the ensuing description. It is sufficient to say at this point that by the use of the interpolated pulse where no pulse normally occurs one purpose it serves is that of punching a card and keeping the subsequent cards in the proper sequence when punch card storage system is used, which is essential to assure a correct evaluation.

Having thus considered and described the structural components of a preferred embodiment of this invention, attention is now directed toward a consideration of an illustrative example showing the manner in which this apparatus may be operated. In connection with such a discussion, it will be assumed, as indicated earlier, that the seismogram mounted on drum 12 is a multi-trace magnetic tape having four geophone traces. It will further be assumed that the visual presentation on drum 14 is a visual type record formed by oscillographic traces. It will also be assumed that the visual seismogram is similar to that illustrated in Figure 2 and that it is a consistent reproduction of the seismogram for drum 12. Thus the visual record has a conducting line indicated at A which is substantially parallel to the traces E, F, G, and H recorded thereon. Extending from conducting line A are gate pulse conductors or conductor lines B, C, and D which have been drawn manually substantially through the valleys of the traces at selected crossings as indicated by the reflections recorded on the seismogram. As is apparent in Figure 2, there are three apparent reflection crossings; and it will be assumed that the operator of the equipment desires to reproduce these three crossings to the substantial exclusion of other information on the geophone traces. It will further be assumed that it is desired to translate this information into digital information suitable for introduction into a digital computer. It will be noted that gate pulse conductor lines B, C, and D have been placed essentially through the valleys of a crossing by an operator using a conducting ink or pencil. Lines B, C, and D also connect with common conductor line A.

Having selected and identified the crossings on Figure 2 as indicated above, the operator then places the visual seismogram as represented in Figure 2 upon drum 14. The relative position of the seismogram on durm 14 and of the magnetic tape on drum 12 must be closely oriented in relationship to each other and also in relation to converter 11. In the orientation of converter 11, the time delay for time delays 42 and 68 are taken into account. The operator is then ready to energize the various electrical circuits and start motor 10. As trace E on the magnetic tape rotates with respect to unit E'' of head bank 18, a pulse similar to 36 is transmitted from pulse shaper 32 for each valley on the trace. Gates 40 and 46 block any further transmission of pulse 36 until they are open as will be seen hereinafter. When stylus E' comes into contact with gate pulse conductor line B, a circuit is completed between styli A' and E'; this causes gate generator 60 to emit a square pulse wave with a preferred duration time of 30 milliseconds. This duration time of 30 milliseconds is indicated in Fig. 2 between lines 20 and 22. It is well to note here that when finger E' reaches gate pulse conductor B as it crosses trace E, the recording head on the magnetic tape is at the position of dotted line 20; this is done by pre-orienting the magnetic tape and visual record so that the magnetic head is reproducing its signal approximately 15 milliseconds behind the location of the styli of feelers 48 on the seismogram. This assures that the system will pick up the valley of the crossing, or the reverse of the slope of the amplitude from negative to positive, which might not be detected if the line B for example were drawn through the valley and the slope of the amplitude were not reversing after the line B if the reproducing head 18 were "even" with feeler unit 48. In other words, this reduces the skill and care required in the drawing of line B. When the magnetic head approaches on the magnetic tape what is represented as valley 86 on trace E, a pulse similar to 36 is emitted from pulse shaper 32. This output is divided and goes through time delay 42 which has a storage delay of 30 to 50 milliseconds and in this case it is assumed to have a 30 millisecond delay. Time delay circuit 68 is also assumed to have a time delay of 30 milliseconds. Pulse 62 is then divided through punction 64 into time delay 68 and to gate 40. It will be noted that gate 40 is an electronic device of such character that it requires the combined magnitude of pulse 62 and 36 before it will open. That is, neither pulse alone will open gate 40. When gate 40 is opened, it passes a single pulse 76 which is similar to pulse 36 which operates relay driver 78 which operates relay 80. Relay 80 is adapted, upon being energized, to drive arm 82 so as to contact contact 81. Arm 82 is held in contact with contact 81 for a period sufficient to receive the pulse 44 which passes through electronic gate 46. It is noted that the pulse 62 is also delayed in going through time delay 68 so that it is assured that pulse 44, if it occurs during the gating interval, will reach the bias of gate 46 during the duration of pulse 62 at the proper relative time. The signal is passed from gate 46 to a digital storage translator 84 or other suitable signal receiving means.

The digital storage translator of the type referred to herein is well known and widely used in the art. Briefly it may be stated that the translator 84 is a device capable of storing the output from the shaft position to digital converter 11 and for translating the information thus received into contact closures having a digital representation. Upon receiving the pulse from gate 46 (or from pulse generator 70 as will hereinafter be seen), the translator 84 records in some manner the relative position of converter 11. By suitable cabling, the output of a translator may be used to directly operate a numerical printer with the record as indicated in Fig. 4 or a punch card suitable for use in conjunction with the high speed digital computer. To recapitulate briefly, the translator 84 receives encoded shaft positions from converter 11 and translates the information thus received into a digital representation on a printer or a punch card—the "read out" of the latter information being controlled by the square pulse representative of a valley within the gating interval and being further rendered suitable for introduction to a digital computer, etc.

A preferred sequence of operations for present digital computers is that crossing B is processed for each of the traces E, F, G, and H in that order and then the processing goes to crossing C for traces E, F, G, H, etc., until all of the gate pulse conductor lines which may have been placed on the seismogram are processed. A sequence control unit, not shown, including an electronic counter and step switches, is used to select the proper reflection event and trace. Valleys 87, 88, and 89 will be processed in a manner similar to that for valley 86 previously described. For the purpose of describing another feature of this invention, attention is now directed to trace G and the crossing thereof of conductor line C. As there is no valley or minimum in the gating interval time represented from dotted line 24 to 26 in trace G, it is seen that there is no square pulse 36 emitted by pulse shaper 32 during this particular gating interval. Finger G′ contacts gate pulse conductor line C which completes the circuit starting the gating interval time of 30 milliseconds which is illustrated by pulse 62. This pulse 62 is fed through time delay circuit 68 and thence into pulse generator 70. Pulse generator 70 generates a pulse 72 which is in the center of the gating interval. As a pulse 36 is necessary in addition to pulse 62 to open gate 40 and 46, it is seen that they remain closed during this gating interval. As gate 40 is closed during this interval, arm 82 remains in contact with contact 85 and pulse 72 is fed through switch 83 to translator or storage unit 84. From the above description it is thus seen that a valley is inserted at the relatively proper crossing where no valley existed in the trace. This is desirable to assure that a card is punched for that position or a record made to insure proper tabulation. If the crossing of C across trace G were emitted and punch cards were used, it is seen that trace G would be missing one punch card which would give an erroneous subsequent calculation or in the use of some punch card systems, would render the machine inoperative. Another desirable feature of this invention is illustrated where pulse conducting line B crosses trace G. It is noted that the gate interval as indicated by dotted lines 28 to 30 does not include any valley or reversing slope of the amplitude of trace G. In this instance a time pick is provided similarly as above at the crossing of gate pulse conductor line C and trace G. This feature is very important and desirable as it reduces the care and skill required of the operator and eliminates the error caused by a slight misplacement of the conductive marking of the crossing. This is especially true when the traces are spaced more closely together than as indicated in Figure 2.

Figure 4 illustrates the recording of time on paper tape by the Clary printing device which is well known to those skilled in the art. The recorded time corresponds to valleys on the trace and is measured with respect to an arbitrary zero at the front of the record. It is seen that without use of the present invention the times enclosed by the dotted lines for events OC and OG, trace number OG would not appear in the time zone but would be missing and the numbers below would be moved up. The values of the time column would thus be out of order and would be short two time measurements. Importance of including the time pick for each crossing of each trace is therefore readily apparent.

Figure 3:
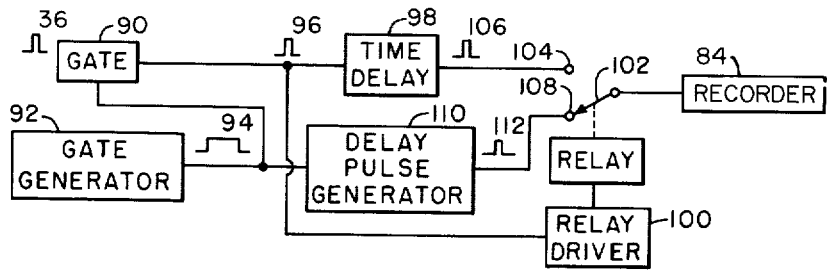
Fig. 3 illustrates an alternate embodiment of the time delay and gating circuitry illustrated in Fig. 1; and, Fig. 4 illustrates one type read out of the information and is in the form of a paper tape read out.

Attention is now directed to Fig. 3 in which an alternate gating and selection circuit is shown. Numeral 36 represents the square or shaped pulses from pulse shaper 34 which in this case are fed to electronic gate 90 which may be similar to electronic gate 40 or 46. Gate generator 92 which may be similar to gate generator 60 is actuated by feelers 48 detecting an electrical conductive marking on the visual seismogram in a manner similar to that which actuates gate generator 60. When gate generator 92 is actuated, it emits a square pulse 94 of a predetermined magnitude and for a predetermined gating interval time or duration. Electronic gate 90 is of such a character that it requires the combined magnitude of pulse 36 and pulse 94 to open. When gate 90 is opened, only a single pulse 96, which is a first pulse of 36 which reaches gate 90 during the gating interval indicated by pulse 94, is passed therethrough. Pulse 96 is fed to time delay circuit 98, which may be similar to time delay circuit 42, and pulse 96 is also fed to relay drive 100 which causes switch arm 102 to make contact with contact 104 and is held in that position a sufficient length of time so that pulse 106 from time relay 98 is fed to the translator, storage or recorder 84. If there is no pulse 96 to pass through gate 90 during the gating interval, then the relay 100 is such as to make switch arm 102 make contact with contact 108. A delay pulse generator 110 is electrically connected to the output of gate generator 92. The delay pulse generator 110 receives gate interval pulse 94 and stores or delays it for the same length of time as the time delay in time delay circuit 98; after the delay, pulse 112 is emitted during a predetermined portion of time interval 94, usually being in the center thereof.

To recapitulate briefly, then, this invention relates to an apparatus and method for extracting desired time information from a multi-trace reproducible seismogram or record with events recorded thereon with respect to time. A conducting line is drawn at a selected reflection event or events all across a visual presentation of the record and is used to actuate a gate generator which then sets a gating time interval. A time delay path for the signal generated from the reproducible record is provided to feed, if selected, a translator means, and a parallel path without time delay is used to decide whether to use the actual event which is still carried in the time delay path if a valid pick is present or to insert an interpolated valley pick in the absence of a valid event. The "no delay path" allows the system to decide whether to switch in time to pick up the delayed valid time pick, or to assume a position to read out an inserted pulse representing a time pick at the center of the gate interval which introduces the interpolated time pick to a translator.

It is apparent that changes and modifications of the system as set out hereinbefore may be made without departing from the spirit and scope of the invention. For example, the type of gating control of the invention may be used in any application of converting analog information to digital information when it is desired to selectively extract certain data therefrom. If an exact selection of the data needs to be controlled by a prior approximate selection, the use of the delay principle of the invention can be used in any application where a decision must be made at one time to decide what action an early time requires.

It will be understood that the apparatus and system contained in the above description are merely representative or illustrative and not limiting and that numerous modifications may be made therein without departing from the scope of the invention.

The invention claimed is:

1. An apparatus for extracting information from a multi-trace reproducible type seismogram which comprises a mounting means adapted to receive said reproducible seismogram, another mounting means adapted to receive a visual presentation of said seismogram with said presentation having selected events indicated thereon with electrical conductive markings, reproducing means adapted to scan along the length of each trace of said reproducible seismogram and produce a first electrical signal comprising an electrical pulse for each valley of said trace, scanning means adapted to scan along the length of each trace on said visual seismogram and to detect said conductive markings thereon, gate pulse generating means adapted to generate an electrical pulse of a predetermined magnitude and a predetermined gating time interval to be actuated when said scanning means detects said conductive markings on said visual presentation, an electronic gate adapted to open upon receiving said pulse during the gating time interval and being further characterized to pass only the first pulse therethrough during said gating interval, time delay circuits for storing said first pulse for a predetermined time, delayed pulse generator means adapted to generate an interpolated pulse to occur during the gating interval time which has been delayed the same delay as occurs in said time delay circuit, a recorder and switching means adapted to record the time delayed first pulse when said electronic gate opens and said interpolated pulse if said electronic gate remains closed.

2. An apparatus for extracting information from a multi-trace reproducible type seismogram which comprises mounting means adapted to receive said reproducible seismogram, another mounting means adapted to receive a visual presentation of said seismogram with said visual presentation having events indicated thereon with electrical conductive markings, reproducing means adapted to scan along the length of each trace of said reproducible seismogram and reproduce electrical signals therefrom representative of the seismic signals from which the seismogram was originally produced, scanning means adapted to scan along the length of each trace on said visual seismogram to detect said conductive markings, means to generate a gating pulse of a predetermined magnitude for a predetermined gating time interval with said gating time interval beginning when said scanning means detects said conductive markings on said visual presentation, a first time delay electronic circuit adapted to receive said electrical signal, a second time delay circuit with same delay as said first delay circuit and adapted to receive said gating pulse, means to generate another electrical signal during said gating time interval of a predetermined magnitude and duration during said gating time interval, an electronic gate adapted to receive said gating pulse and said electrical signal and being further characterized by being adapted to open when said electrical signal is received during the receiving thereof of said gating pulse, a second electronic gate adapted to receive the delayed electrical signal and the delayed gating pulse and being further characterized by being adapted to open when said delayed electrical signal is received during the receiving thereof of the delayed gating pulse, a recorder means adapted to record said electrical signal from said second electronic gate if said electronic gate is opened during said gating time interval and said third electrical signal if said electronic gate does not open with said recorder being further adapted to record the selected signal in relation to the position of a reference line.

3. An apparatus for extracting information from a multi-trace reproducible type seismogram which comprises mounting means adapted to receive said reproducible seismogram, another mounting means adapted to receive a visual presentation of said seismogram with said visual presentation having selected events indicated thereon with electrical conductive markings, reproducing means adapted to scan along the length of each trace of said reproducible seismogram and reproduce electrical signals therefrom representative of the seismic signals from which the seismogram was originally produced, scanning means adapted to scan along the length of each trace on said visual seismogram to detect said conductive markings thereon, means to generate a gating pulse of a predetermined magnitude for a predetermined gating time interval with said gating time interval beginning when said scanning means detects said conductive markings on said visual presentation, means to generate another electrical signal during said gating time interval of a predetermined magnitude and duration during said gating time interval, an electronic gate adapted to receive said gating pulse and said electrical signal and being further characterized by being adapted to open when said electrical signal is received during the receiving thereof of said gating pulse, means for delaying said electrical signal from said gate and said other electrical signal, a recorder adapted to record the delayed electrical signal when said electronic gate is opened and said other electrical signal if said electronic gate remains closed.

4. An apparatus as defined in claim 3 wherein said recorder is adapted to record said selected signals in relation to the position of a reference line.

References Cited in the file of this patent

UNITED STATES PATENTS

| | | |
|---|---|---|
| 2,597,866 | Gridley | May 27, 1952 |
| 2,791,288 | Meier | May 7, 1957 |
| 2,841,777 | Blake | July 1, 1958 |
| 2,920,306 | Feagin | Jan. 5, 1960 |